United States Patent
Iyoda et al.

(10) Patent No.: US 6,926,326 B2
(45) Date of Patent: Aug. 9, 2005

(54) REAR BUMPER STRUCTURE FOR VEHICLE

(75) Inventors: Hirochika Iyoda, Hiroshima (JP); Harunori Nagao, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/781,702

(22) Filed: Feb. 20, 2004

(65) Prior Publication Data

US 2004/0189025 A1 Sep. 30, 2004

(30) Foreign Application Priority Data

Mar. 31, 2003 (JP) ........................................ 2003-095432

(51) Int. Cl.[7] .............................................. B60R 19/38
(52) U.S. Cl. ...................... 293/149; 293/118; 296/50; 296/57.1; 296/193.08
(58) Field of Search ................................ 293/149, 118, 293/102, 142, 145, 120; 296/50, 51, 57.1, 187.03, 187.11, 193.08

(56) References Cited

U.S. PATENT DOCUMENTS

| | | | | |
|---|---|---|---|---|
| 1,415,518 A | * | 5/1922 | Buck | 293/34 |
| 2,953,409 A | * | 9/1960 | Barenyi | 296/187.03 |
| 3,533,654 A | * | 10/1970 | Kannegieter | 280/164.1 |
| 4,582,351 A | * | 4/1986 | Edwards | 293/118 |
| 5,016,933 A | * | 5/1991 | Smit | 293/117 |
| 5,678,872 A | * | 10/1997 | Slater | 293/118 |
| 5,951,233 A | * | 9/1999 | Boucher et al. | 414/495 |
| 6,109,675 A | * | 8/2000 | Sumrall | 293/118 |
| 6,764,118 B2 | * | 7/2004 | DePottey et al. | 293/118 |

FOREIGN PATENT DOCUMENTS

| | | |
|---|---|---|
| EP | 0 745 516 B1 | 6/2000 |
| EP | 1-162-116 A2 | 12/2001 |
| GB | 987996 | 3/1965 |
| GB | 2 141 978 A | 1/1985 |
| JP | 58-089418 | 5/1983 |
| JP | 2003-104141 | 4/2003 |

OTHER PUBLICATIONS

European Search Report for Application No. EP-04-00-6883, dated Jul. 26, 2004.

* cited by examiner

*Primary Examiner*—D. Glenn Dayoan
*Assistant Examiner*—Greg Blankenship
(74) *Attorney, Agent, or Firm*—Nixon Peabody LLP; Donald R. Studebaker

(57) ABSTRACT

In a rear bumper structure for a vehicle including a rear opening of a load compartment formed at a rear portion of a vehicle body, there are provided a bumper reinforcement fixed to a rear end of a vehicle body so as to define its fixed position with respect to the vehicle body and extend in a vehicle width direction, and a main body of bumper opening-and-closing portion located in front of the bumper reinforcement to selectively open or close a lower part of the rear opening, and a bumper facer attached to the main body to cover the bumper reinforcement from a vehicle rear side, wherein the main body is moved between the vehicle body and the bumper reinforcement such that the bumper reinforcement is always located between the main body and the bumper facer.

9 Claims, 16 Drawing Sheets

(a)

(b)

(a)

(b)

(a)

(b)

(c)

(a)

(b)

REAR BUMPER STRUCTURE FOR VEHICLE

BACKGROUND OF THE INVENTION

The present invention relates to a rear bumper structure for a vehicle.

Conventionally, some vehicles are known in which there is provided a mechanism for moving an entire rear bumper downward as a lift gate opens to provide a wider opening formed at a rear of the vehicle (for example, see European Patent Publication No. 0745516). Further, other vehicles are also known in which there is provided a mechanism for moving only part of the rear bumper downward instead of the entire rear bumper for the same purpose (for example, see UK Patent Publication No. 2141978).

In the event that the mechanism for moving the entire or part of the rear bumper downward is used, it is necessary to provide the rear bumper with a rigidity which is strong enough to be supported for its movement and to place a latch mechanism on it so as to engage the vehicle body.

Further, in the event that a bumper reinforcement disposed inside as a reinforcement member is moved along with the rear bumper, its structure is apt to be rather complicated inevitably because it is necessary to provide a latch mechanism for enabling the bumper reinforcement to be detachable to the vehicle body and further such latch mechanism needs a sufficient strength.

SUMMARY OF THE INVENTION

The present invention has been devised in view of the above-described problems, and an object of the present invention is to provide a rear bumper structure for a vehicle in which a rear bumper itself can be provided with a sufficient strength and both layouts of a bumper reinforcement fixed to a vehicle body and the rear bumper movable in a vertical direction of the vehicle can be compatible.

In order to achieve the above-described object, the first aspect of the present invention provides a rear bumper structure for a vehicle, comprising a bumper reinforcement fixed to a rear end of a vehicle body so as to define its fixed position with respect to the vehicle body and extend in a width direction of the vehicle, and a bumper opening-and-closing portion arranged to be movable in a substantially vertical direction of the vehicle so as to selectively open or close a lower part of a rear opening of a load compartment formed at a rear portion of the vehicle body, constituting at least part of a rear bumper of the vehicle, wherein the bumper opening-and-closing portion includes a main body of bumper opening-and-closing portion which is located in front of the bumper reinforcement in a longitudinal direction of the vehicle, a bumper facer which is attached to the main body to cover the bumper reinforcement from a rear side of the vehicle, and a moving mechanism which moves the main body in the substantially vertical direction of the vehicle and between the vehicle body and the bumper reinforcement such that the bumper reinforcement is always located between the main body and the bumper facer.

According to the first aspect of the invention, the main body of bumper opening-and-closing portion is moved between the vehicle body and the bumper reinforcement such that the bumper reinforcement is always located between the main body and the bumper facer. As a result, both layouts of the rear bumper moving in the vertical direction of the vehicle and the bumper reinforcement fixed to the vehicle body can be made compatible. Further, in this case, an amount of backward movement of the bumper opening-and-closing portion while opening can be made small. Further, since it is retained so as to be located in front of the bumper reinforcement, the main body of bumper opening-and-closing portion can be protected from a vehicle collision, resulting in an improved repairability.

Further, the second aspect of the present invention provides a rear bumper structure for a vehicle of the first aspect of the invention, wherein the main body of bumper opening-and-closing portion is made of metal, and the bumper reinforcement is made of resin.

According to the second aspect of the invention, since part of the rear bumper moving in the substantially vertical direction of the vehicle includes the metal main body and the resin bumper facer forming an outer face of the vehicle body, a sufficient rigidity of the bumper opening-and-closing portion as a whole can be obtained by its inside structure and the outer face of the vehicle body can be prevented from being hard.

Further, the third aspect of the present invention provides a rear bumper structure for a vehicle of the first aspect of the invention, wherein the moving mechanism of the bumper opening-and-closing portion includes a supporting member connected to the main body of bumper opening-and-closing portion.

According to the third aspect of the invention, since the supporting member is connected to the main body of bumper opening-and-closing portion which is protected by the bumper reinforcement, deterioration of functions of the vehicle caused by a light-collision of vehicle and the like can be prevented.

Further, the fourth aspect of the present invention provides a rear bumper structure for a vehicle of the first aspect of the invention, wherein there is provided at the vehicle body a seal which is located so as to contact the main body when the main body of bumper opening-and-closing portion is in its closed position.

According to the fourth aspect of the invention, since there is provided at the vehicle body the seal located to contact the main body when the main body is in its closed position, the deterioration of functions of the vehicle caused by the light-collision of vehicle and the like can be prevented.

Further, the fifth aspect of the present invention provides a rear bumper structure for a vehicle of the first aspect of the invention, wherein there is provided at the main body of bumper opening-and-closing portion an engagement member for engaging the vehicle body to retain the main body in its closed position when the main body of bumper opening-and-closing portion is in its closed position.

According to the fifth aspect of the invention, since there is provided at the main body protected by the bumper reinforcement the engagement member corresponding to a lock mechanism disposed at the vehicle body, the deterioration of functions of the vehicle caused by the light-collision of vehicle and the like can be prevented.

Further, the sixth aspect of the present invention provides a rear bumper structure for a vehicle of the first aspect of the invention, wherein there is provided at the vehicle body a lift gate for selectively opening or closing an upper part of the rear opening of the load compartment, and there is provided at the main body of bumper opening-and-closing portion a seal which is located so as to contact the lift gate when the bumper opening-and-closing portion is in its closed position.

According to the sixth aspect of the invention, since there is provided at the main body protected by the bumper reinforcement the seal located to contact the lift gate when the main body of bumper opening-and-closing portion is in its closed position, the deterioration of functions of the vehicle caused by the light-collision of vehicle and the like can be prevented.

Further, the seventh aspect of the present invention provides a rear bumper structure for a vehicle of the first aspect of the invention, wherein there is provided at the vehicle body a lift gate for selectively open or close an upper part of the rear opening of the load compartment, and there is provided at the main body of bumper opening-and-closing portion an engagement member for engaging the lift gate when the main body of bumper opening-and-closing portion is in its closed position.

According to the seventh aspect of the invention, since there is provided at the main body protected by the bumper reinforcement the engagement member for engaging the lift gate when the main body is in its closed position, the deterioration of functions of the vehicle caused by the light-collision of vehicle and the like can be prevented.

Further, the eighth aspect of the present invention provides a rear bumper structure for a vehicle of the third aspect of the invention, wherein the supporting member is pivotally connected about a specified axis at the vehicle body, and the specified axis is located at a substantially middle position of the bumper facer in the vertical direction of the vehicle.

According to the eighth aspect of the invention, since the supporting member is pivotally connected about the specified axis at the vehicle body and the specified axis is located at the substantially middle position of the bumper facer in the vertical direction of the vehicle, an area of the rear bumper moving in the vertical direction of the vehicle can be made small.

Further, the ninth aspect of the present invention provides a rear bumper structure including a rear opening of a load compartment formed at a rear portion of a vehicle body and a lift gate for selectively opening or closing an upper part of the rear opening of the load compartment, comprising a bumper reinforcement fixed to a rear end of a vehicle body so as to define its fixed position with respect to the vehicle body and extend in a width direction of the vehicle, and a bumper opening-and-closing portion arranged to be movable in a substantially vertical direction of the vehicle so as to selectively open or close a lower part of the rear opening of the load compartment, constituting at least part of a rear bumper of the vehicle, wherein the bumper opening-and-closing portion includes a main body of bumper opening-and-closing portion which is located in front of the bumper reinforcement in a longitudinal direction of the vehicle, a bumper facer which is attached to the main body to cover the bumper reinforcement from a rear side of the vehicle, and a moving mechanism which moves the main body in the substantially vertical direction of the vehicle and between the vehicle body and the bumper reinforcement such that the bumper reinforcement is always located between the main body and the bumper facer, wherein the moving mechanism of the bumper opening-and-closing portion includes a supporting member connected to the main body of bumper opening-and-closing portion, and there is provided at the main body of bumper opening-and-closing portion an engagement member for respectively engaging the vehicle body and the lift gate when the main body of bumper opening-and-closing portion is in its closed position.

According to the ninth aspect of the invention, substantially the same functions and effects as the first, third, fifth and seventh aspects of the invention can be obtained.

DETAILED DESCRIPTION OF THE INVENTION

Hereinafter, preferred embodiments of the present invention will be described with reference to the accompanying drawings.

Figure 1:
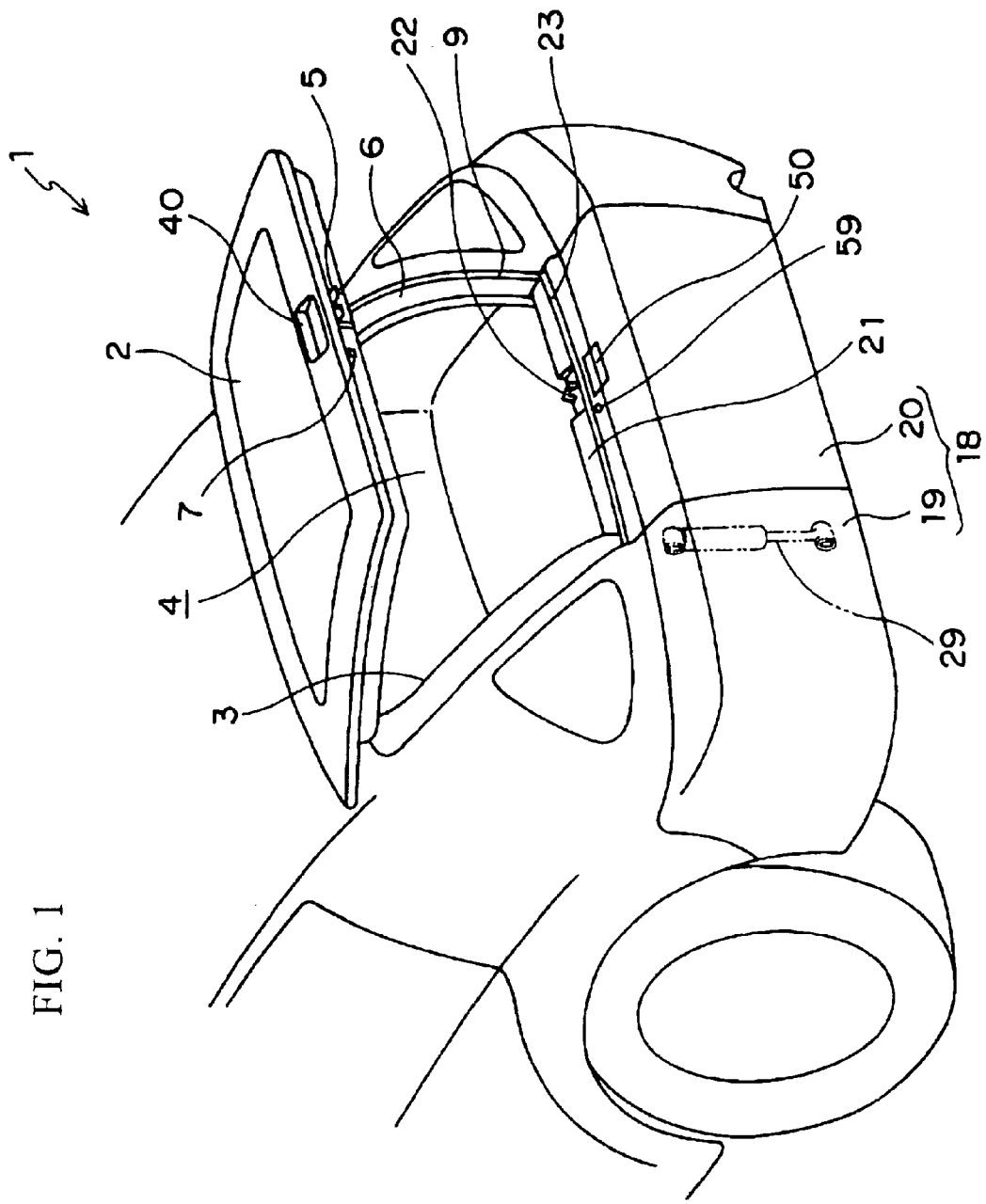
FIG. 1 is a perspective view illustrating a vehicle with a lift gate opened according to a preferred embodiment of the present invention, when viewed from a rear side of the vehicle.
Figure 2:
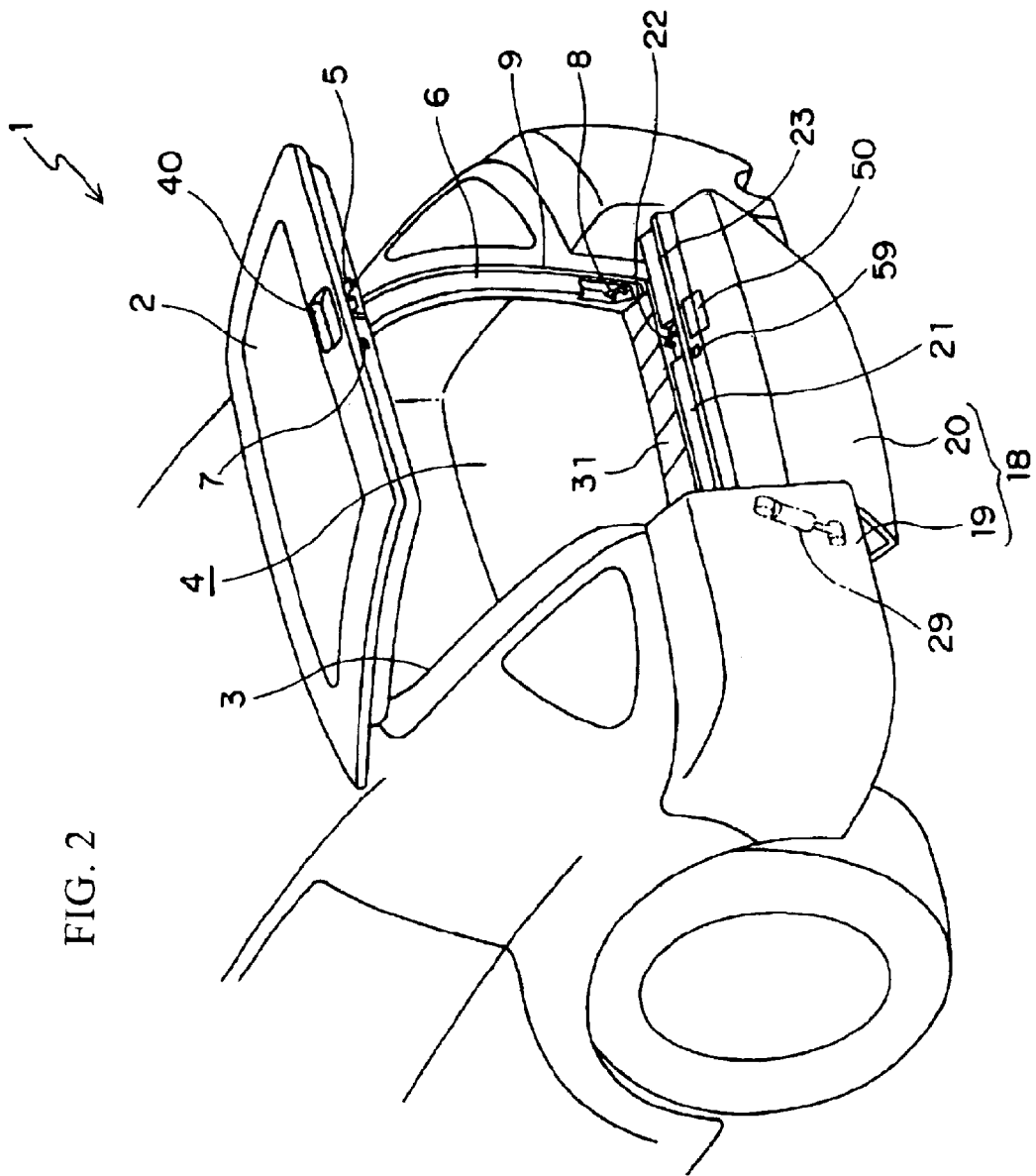
FIG. 2 is a perspective view illustrating the vehicle with the lift gate opened and a bumper opening-and-closing portion opened, when viewed from the rear side of the vehicle.

FIGS. 1 and 2 are perspective views illustrating respectively vehicles with a lift gate opened and with a part of a bumper opened in addition to the lift gate opened, according to a preferred embodiment of the present invention, when viewed from a rear side of the vehicle. In a vehicle 1, there: is provided a lift gate 2 to selectively open or close an upper part of a rear opening 3 of a rear load compartment 4 which is formed at a rear portion of the vehicle, and there is also provided a rear bumper 18 which is configured such that a portion thereof corresponding to a lower end portion of the lift gate 2 is movable in a vertical direction and covers a lower part of the rear opening 3 of the rear load compartment 4 so as to selectively open or close the lower part of the rear opening 3 in order to provide a wider rear opening 3 of the rear load compartment 4. The rear bumper 18 is comprised of a fixed portion 19 located at side portions thereof and a bumper opening-and-closing portion 20 located at a central portion thereof, which are split in the width direction of the vehicle. The bumper opening-and-closing portion 20 is connected to the vehicle body via various members including an expandable damper 29 so as to be movable in the vertical direction of the vehicle.

The vehicle 1 is provided with a latch 5 fixed to a lower end of the lift gate 2 and a striker 22 fixed to an upper end of the bumper opening-and-closing portion 20, which constitute a lock mechanism for retaining the lift gate 2 in a closed position where it closes the upper part of the opening 3 of the rear load compartment 4. The latch 5 and striker 22 engage each other to retain the lift gate 2 in its closed position when both of the bumper opening-and-closing portion 20 and the lift gate 2 are closed.

Figure 3:
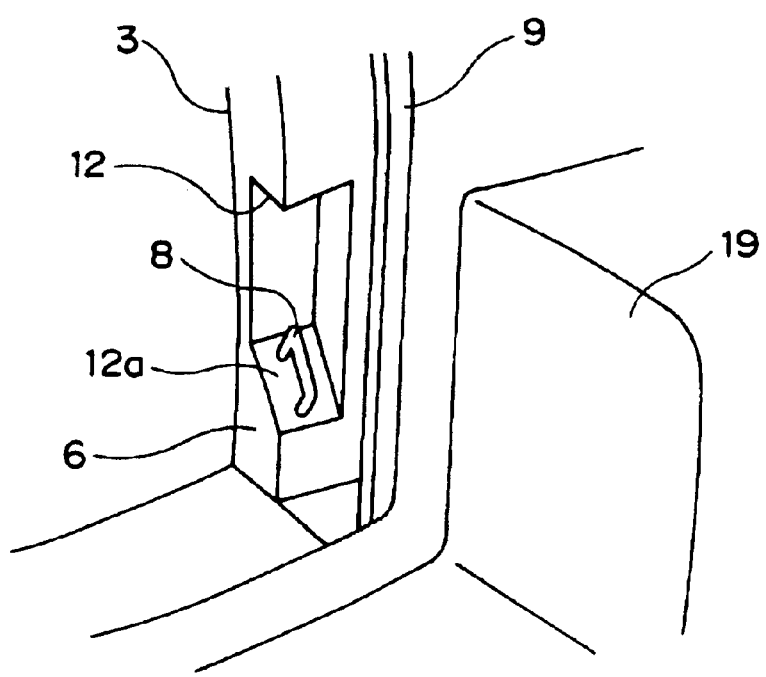
FIG. 3 is an enlarged perspective view illustrating a lock mechanism for the bumper opening-and-closing portion.

Further, as a lock mechanism for retaining the bumper opening-and-closing portion 20 in a closed position where it closes the lower part of the opening 3 of the rear load compartment 4, there are provided strikers 8 fixed at near both ends of a frame 6 which defines part of the opening 3 (upper side and both sides thereof) of the rear load compartment 4 and latches 24. (see FIG. 5) fixed at inside faces (front-side faces of the vehicle) of the bumper opening-and-closing portion 20 corresponding to the strikers 8. FIG. 3 is an enlarged illustration of the striker 8 which is fixed at near right-side end of the frame 6 and its surrounding area. A dent 12 is formed, as shown in FIG. 3, at near lower end of the frame 6, which includes an inclined surface 12a. The striker 8 is attached on the inclined surface 12a so as to protrude rearward and upward. When the bumper opening-and-closing portion 20 is closed, the striker 8 and the latch 24 engage each other to retain the bumper opening-and-closing portion 20 in its closed position.

Further, as illustrated in FIGS. 1 and 2, the vehicle 1 is provided with a first operating lever 40 disposed at near the lower end of the lift gate 2 and a second operating lever 50 disposed at the upper end of the bumper opening-and-closing portion 20, which constitute respectively operating levers for opening the lift gate 2 and the bumper opening-and-closing portion 20 by unlocking the above-described lock mechanism. The second operating lever 50 is configured so as to unlock the lock mechanism (striker 8 and latch 24) for the bumper opening-and-closing portion 20 to open the bumper opening-and-closing portion 20 from the closed state of the lift gate 2.

Meanwhile, the first operating lever 40 is configured so as to unlock the lock mechanism (striker 22 and latch 5) for the lift gate 2 to open the lift gate 2. Further, in the present embodiment, the first operating lever 40 is configured so as to unlock the lock mechanism (striker 8 and latch 24) for the bumper opening-and-closing portion 20 to open the lift gate 2 and the bumper opening-and-closing portion 20 at the same time, in addition to unlocking the lock mechanism for the lift gate 2. Namely, the operation of the first operating lever 40 can open only the lift gate 2 and also open both of the lift gate 2 and the bumper opening-and-closing portion 20 at the same time. In order to achieve this, in the present embodiment, apertures 7, 59 are formed respectively at the lower end of the lift gate 2 and the upper end of the bumper opening-and-closing portion 20, and a linkage mechanism associating the first operating lever 40 with the second operating lever 50 through these apertures 7, 59 is provided.

The first operating lever 40, the second operating lever 50 and the linkage mechanism between the levers 40, 50 will be described in detail later referring to FIGS. 9 to 13.

Figure 4:
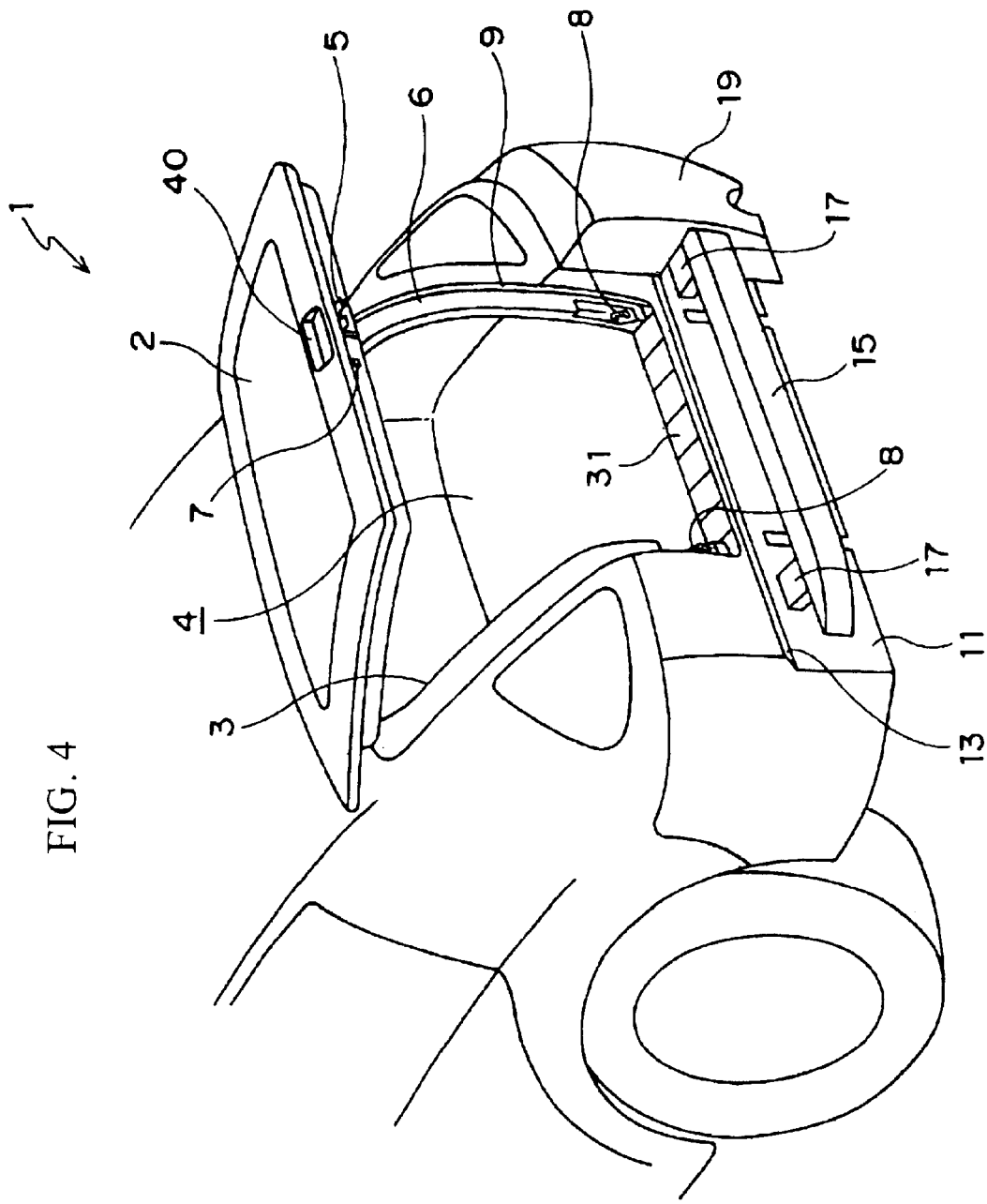
FIG. 4 is a perspective view illustrating the vehicle in which the bumper opening-and-closing portion and part of its next rear bumper are removed, when viewed from the rear side of the vehicle.

FIG. 4 is a perspective view illustrating the vehicle in which the bumper opening-and-closing portion 20 and one of the fixed portions 19 are removed, when viewed from the rear side of the vehicle. A bumper reinforcement 15 is disposed inside the rear bumper 18 extending the vehicle width direction to increase a vehicle rigidity at the rear end of the vehicle, which is fixed to a rear end panel 11 at the vehicle rear end via supporting members 17 extending in a longitudinal direction of the vehicle so as to define its fixed position with respect to the vehicle body.

Further, as shown in FIG. 4, a seal 9 is provided at and along the frame 6 defining the upper and both sides of the opening 3 of the rear load compartment 4 of the vehicle 1. The seal 9 contacts the lift gate 2 when the lift gate 2 is closed so as to provide a sealing between the vehicle body and the lift gate 2. Further, a seal 13 is provided at and along the lower portion of the opening 3 of the rear load compartment 4 extending the vehicle width direction. The seal 13 contacts the bumper opening-and-closing portion 20 when the bumper opening-and-closing portion 20 is closed so as to provide a sealing between the vehicle body and the bumper opening-and-closing portion 20.

Figure 5:
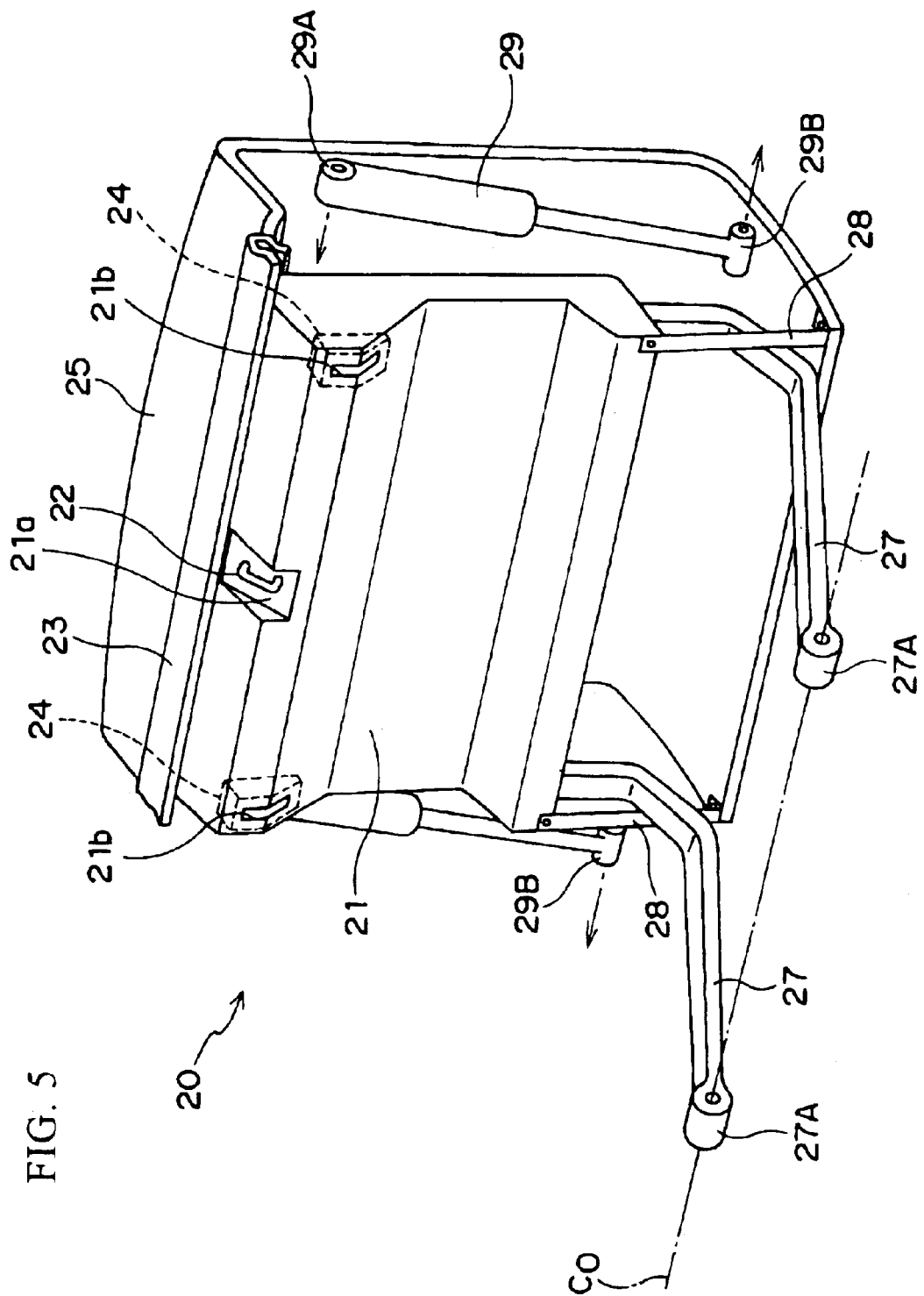
FIG. 5 is a perspective view illustrating the bumper opening-and-closing portion, when viewed from a front side of the vehicle.

FIG. 5 is a perspective view illustrating the bumper opening-and-closing portion 20, when viewed from a front side of the vehicle. The bumper opening-and-closing portion 20 is basically comprised of a main body of bumper opening-and-closing portion 21 extending in the vehicle width direction along the lower portion of the opening 3 of the rear load compartment 4, a bumper facer 25 attached to the main body 21 from the rear side of the vehicle to define an outer surface of the rear bumper 18, and a swingable supporting member 27 extending forward from a lower end of the main body 21, which constitute a basic structure thereof.

The main body of bumper opening-and-closing portion 21 is formed of a hollow member which is made of a metal plate, which is provided with a lock mechanism (striker 22 and latch 24) for retaining the lift gate 2 and the bumper opening-and-closing portion 20 respectively in their closed positions. The striker 22 operative to engage the latch 5 fixed at the lower end of the lift gate 2 is attached on an inclined surface 21a formed at the center of the upper end of the main body 21 so as to protrude forward and upward. Meanwhile, the latch 24 operative to engage the striker 8 fixed on the frame 6 defining the opening 3 of the rear load compartment 4 is attached inside the hollow member of the main body 21, corresponding to a pair of penetrating holes 21b formed at near the upper end of the both side of the main body 21.

Further, a seal 23 is attached at an upper-rear end of the main body 21 so as to extend in the vehicle width direction and protrude rearward and upward. The seal 23 contacts the lift gate 2 when the lift gate 2 and the bumper opening-and-closing portion 20 are closed so as to provide a sealing between the lift gate 2 and the bumper opening-and-closing portion 20 (more specifically, the main body 21).

The bumper facer 25 is made of resin, whose lower end extends forward and located just below the main body 21. The lower end of the bumper facer 25 and a lower end portion of the main body 21 are connected via stay members 28.

Each of the swingable supporting members 27 is fixed to the lower end of the main body 21 at its one end, and has a configuration that it extends downward from the one end and then curves and finally extends forward and upward. Its forward end 27A is supported on a coaxial pivotal axis $C_0$ which is located forward, so that the member 27 is swingable about the axis $C_0$. Accordingly, the bumper opening-and-closing portion 20 is arranged so as to be swingable with respect to the vehicle body and selectively open or close the lower part of the opening 3 of the rear load compartment 4.

Details of a movement of the bumper opening-and-closing portion 20 via the swingable supporting members 27 will be described later referring to FIGS. 6 and 7. Herein, the configuration of the swingable supporting members 27 is not limited to the above-described one. Any configuration may be applied to the member 27, as long as the movement of the bumper opening-and-closing portion 20, which will be described below in detail, can be performed.

There are provided dampers 29 which are expandable in a longitudinal direction thereof at the bumper opening-and-closing portion 20, in addition to the swingable supporting members 27 for the bumper opening-and-closing portion 20. The dampers 29 are disposed at both sides of the bumper opening-and-closing portion 20, and each of their upper end portions 29A is supported pivotally on a specified axis at the bumper opening-and-closing portion 20 via a connecting member (not shown in any drawings), while each of their lower portions 29B is supported pivotally on a specified axis at the vehicle body. The dampers 29 are expandable according to the movement of the bumper opening-and-closing portion 20.

Next, the movement of the bumper opening-and-closing portion 20 will be described referring to FIGS. 6 and 7. FIGS. 6(a) and 6(b) are explanatory vertically-sectional views of the bumper opening-and-closing portion 20 respectively in its closed and opened positions, taken at its central portion in the vehicle width direction. As shown in these figures, the bumper facer 25 of the bumper opening-and-closing portion 20 is attached to the main body 21 via its plural portions including a connecting portion 25a close to its forward and upper end, covering the bumper reinforcement 15 from the rear side of the vehicle. In the closed position shown in FIG. 6(a), the seal 13 provided on the rear side panel 11 contacts the lower end portion of the main body of bumper opening-and-closing portion 21 closely, thereby providing a sealing between the vehicle body and the bumper opening-and-closing portion 20.

The damper 29 disposed at the side of the bumper opening-and-closing portion 20 takes its fully-extended position in the closed state shown in FIG. 6(a), and then decreases its length as the bumper opening-and-closing portion 20 opens and finally it takes its fully-contracted position in the opened state shown in FIG. 6(b).

Further, a plate member 31 coupled to a floor board 34 which constitutes a floor of the rear load compartment 4 is designed such that it rises, facing to the bumper opening-and-closing portion 20, so as to constitute part of a wall of the rear load compartment 4 in the closed state shown in FIG. 6(a), while it falls down backward and is kept in a horizontal position in the opened state shown in FIG. 6(b). The horizontally-kept plate member 31 covers a gap between the vehicle body and the bumper opening-and-closing portion 20 in the opened state, thereby preventing small materials from dropping in when, for example, some loads are brought in. A spare tire pan 33a formed at part of a floor panel 33 is located below the floor board 34 at the center in the vehicle width direction.

FIGS. 7(a) and 7(b) are explanatory vertically-sectional views of the bumper opening-and-closing portion 20 respectively in its closed and opened positions, taken at its side portion in the vehicle width direction. The bumper opening-and-closing portion 20 is retained in its closed state as shown in FIG. 7(a) by the engagement of the striker 8 fixed on the frame 6 defining the opening 3 of the rear load compartment 4 and the latch 24 fixed at near the upper end of the main body 21.

Figure 6:
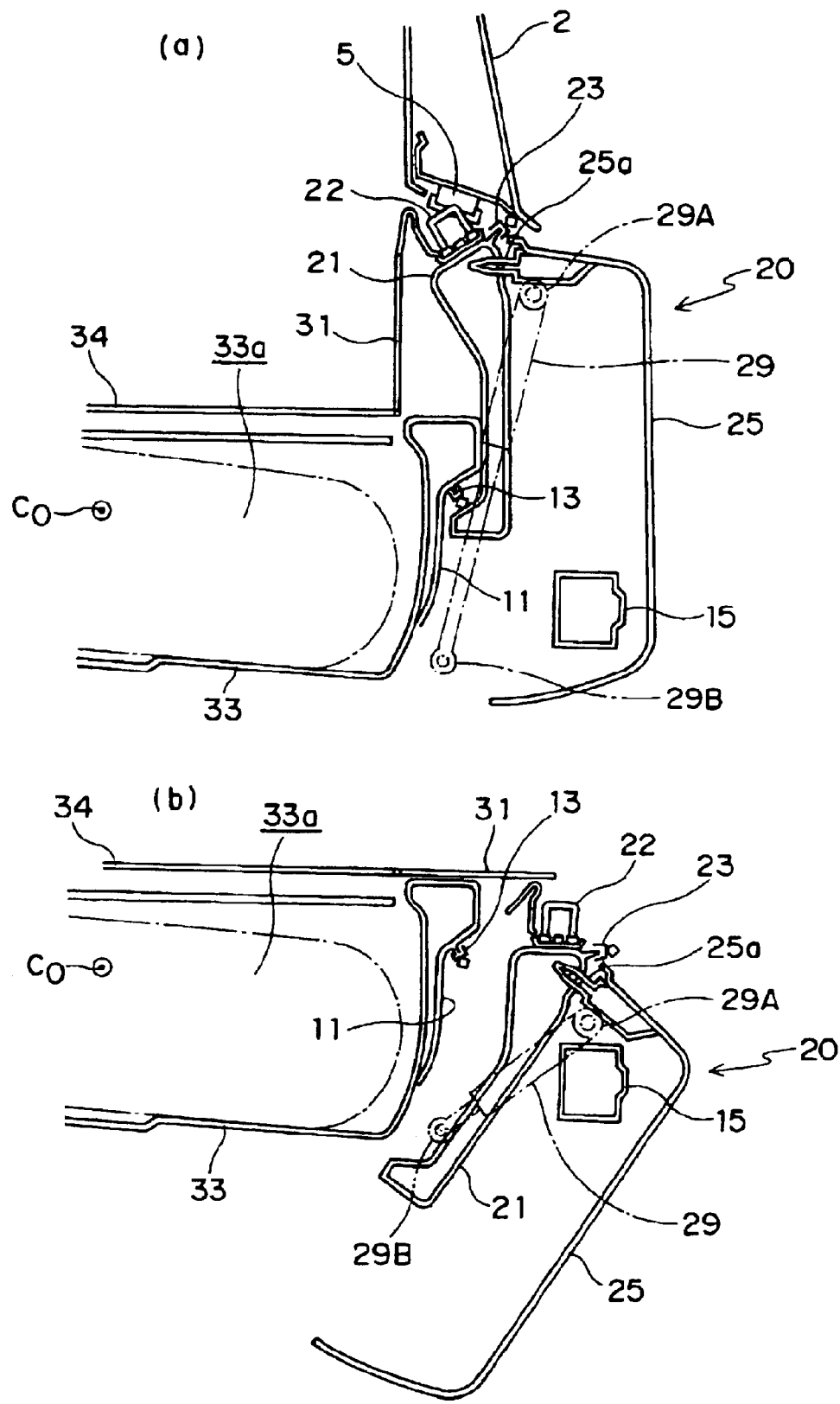
FIG. 6(a) is an explanatory vertically-sectional view of the bumper opening-and-closing portion closed, taken at a central portion thereof in a width direction of the vehicle.
FIG. 6(b) is an explanatory vertically-sectional view of the bumper opening-and-closing portion opened, taken at the central portion thereof in the width direction of the vehicle.
Figure 7:
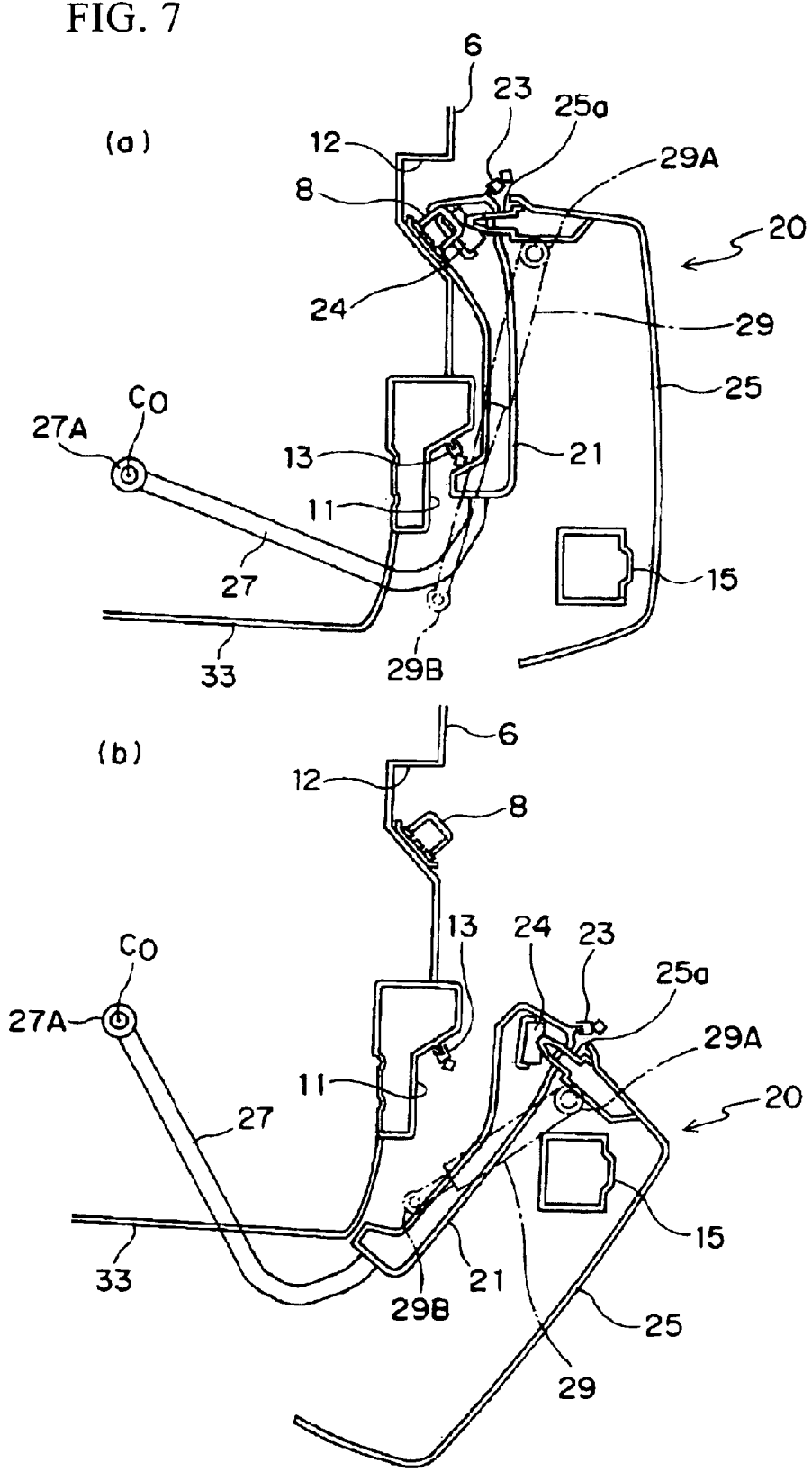
FIG. 7(a) is an explanatory vertically-sectional view of the bumper opening-and-closing portion closed, taken at a side portion thereof in the width direction of the vehicle.
FIG. 7(b) is an explanatory vertically-sectional view of the bumper opening-and-closing portion opened, taken at the side portion thereof in the width direction of the vehicle.

As apparent from FIGS. 6 and 7, the main body 21 of the bumper opening-and-closing portion 20 is connected to the vehicle body via the swingable supporting member 27 which is pivotally supported on the axis $C_0$ located inside the vehicle body and rotates about the axis $C_0$ along with the swingable supporting member 27. Herein, the main body 21 is moved in the substantially vertical direction so that it can be always located in front of the bumper reinforcement 15 and the bumper facer 25 attached to the main body 21 can be always located behind the bumper reinforcement 15.

By moving the main body 21 of the bumper opening-and-closing portion 20 in a space between the vehicle body and the bumper reinforcement 15 such that the bumper reinforcement 15 is always located between the main body 21 and the bumper facer 25 as described above, both layouts of the bumper opening-and-closing portion 20 movable in the substantially vertical direction of the vehicle and the bumper reinforcement 15 fixed to the vehicle body can be compatible. Further, an amount of backward movement of the bumper opening-and-closing portion 20 while opening can be made small.

Further, since it is retained in front of the bumper reinforcement 15, the main body of bumper opening-and-closing portion 21 can be protected from a vehicle collision, resulting in an improved repairability. Also, since the striker 22 corresponding to the latch 5 at the lift gate 2 is attached to the main body 21 protected by the bumper reinforcement 15, deterioration of functions of the vehicle caused by a light-collision of vehicle and the like can be prevented.

Further, since the bumper opening-and-closing portion 20 includes the metal main body 21 and the resin bumper facer 25 forming the outer face of the vehicle body as its basic structure, a sufficient rigidity of the bumper opening-and-closing portion as a whole can be obtained by its inside structure and the outer face of the vehicle body can be prevented from being hard.

Figure 8:
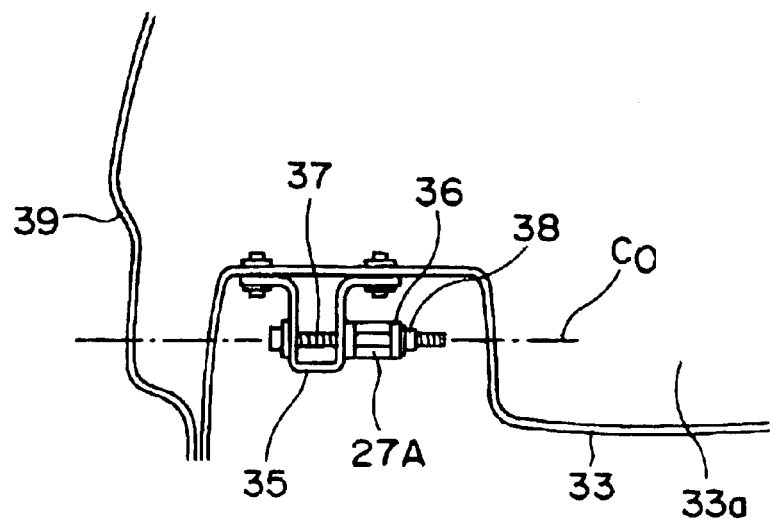
FIG. 8(a) is an explanatory vertically-sectional view illustrating a connecting structure of a swingable supporting member, which supports swingably the bumper opening-and-closing portion, to a vehicle body.
FIG. 8(b) is a perspective view illustrating the connecting structure of the swingable supporting member to the vehicle body.
Figure 8:
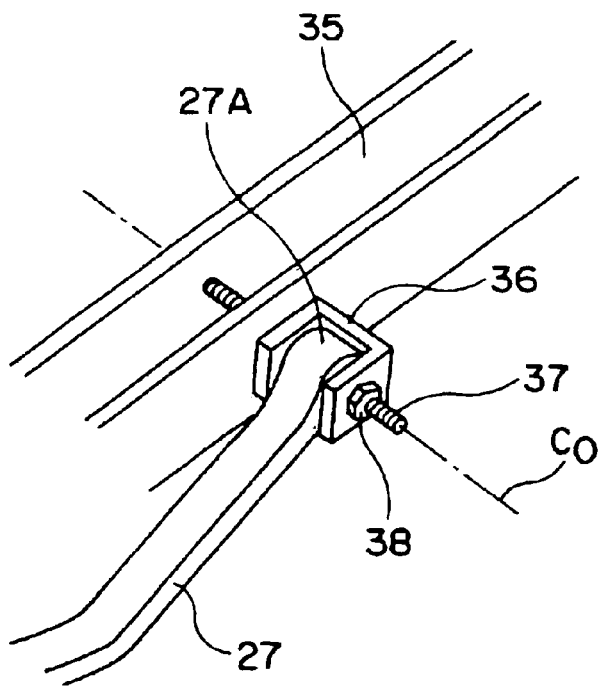

FIGS. 8(a) and 8(b) are an explanatory vertically-sectional view and a perspective view respectively, illustrating a connecting structure of the swingable supporting member 27, which supports swingably the bumper opening-and-closing portion 20, to the vehicle body. The swingable supporting member 27 is connected pivotally on the axis $C_0$ at a rear side frame 35 extending in the longitudinal direction of the vehicle at its end portion 27A extending forward so as to be swingable. The rear side frame 35 is fixed at a portion of a lower surface of the floor panel 33 of the vehicle body forming the spare tire pan 33a, where near a rear side panel 39, as shown in FIG. 8(a).

Further, as shown in FIG. 8(b), a U-shaped bracket 36 is attached to a side portion of the rear side frame 35 via a bolt 37 and a nut 38. The swingable supporting member 27 is pivotally supported on the axis $C_0$ by the bolt 37 getting through the end portion 27A in the bracket 36.

Figure 9:
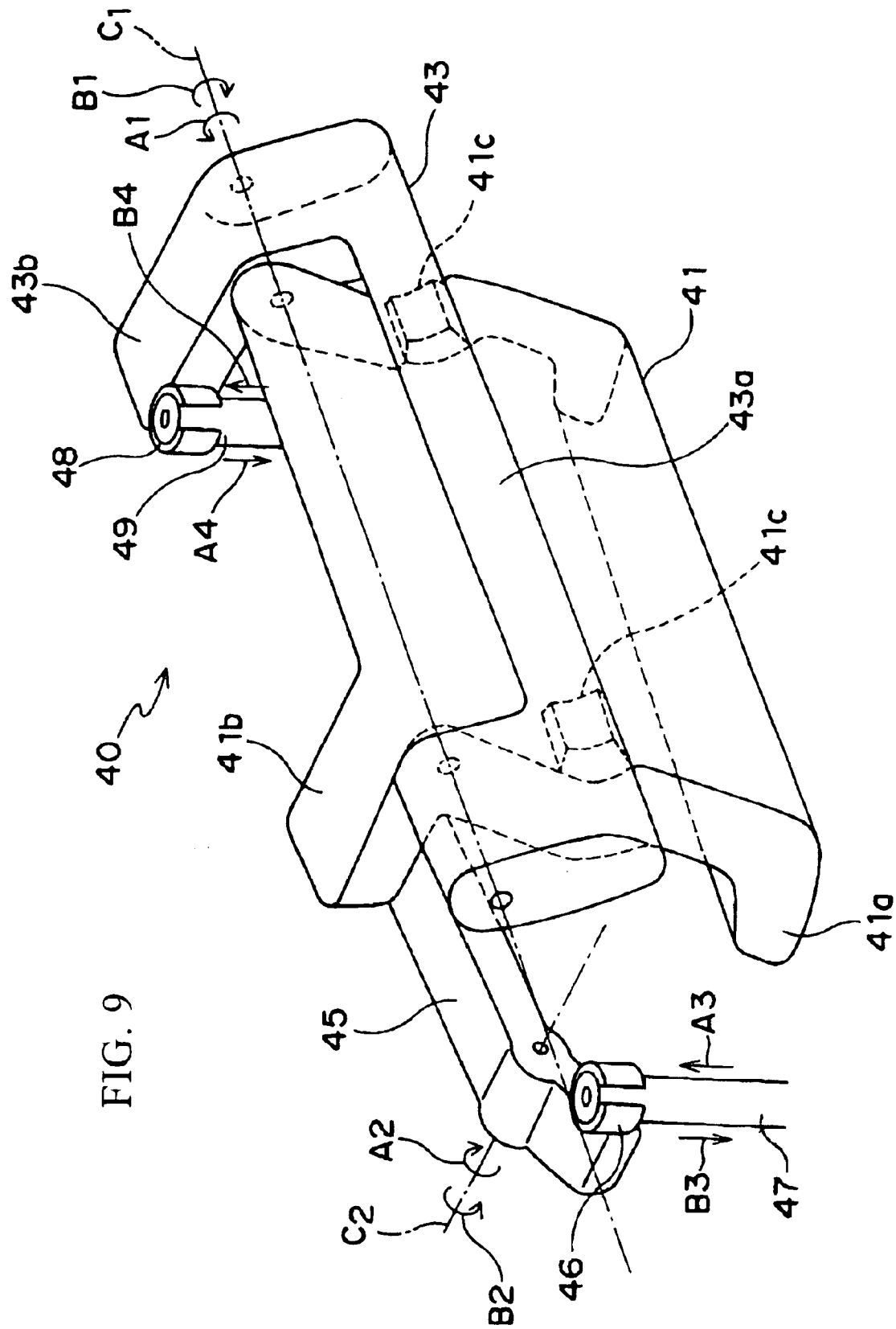
FIG. 9 is a perspective view of a first operating lever for unlocking a lock mechanism for the lift gate and the bumper opening-and-closing portion.

FIG. 9 is a perspective view of the first operating lever 40 disposed at the lower end portion of the lift gate 2 for operating the lift gate 2 and the bumper opening-and-closing portion 20. Herein, the upper left corresponds to the front of the vehicle and the lower right corresponds to the rear of the vehicle in FIG. 9. The first operating lever 40 enables opening of only the lift gate 2 and opening of both of the lift gate 2 and the bumper opening-and-closing portion 20 at the same time. The first operating lever 40 comprises basically a first operating member 41 for operating mechanisms (the first and second unlock mechanisms) at the same time which unlock respective lock mechanisms (latches 5, 24 and strikers 22, 8) retaining closed states of the lift gate 2 and the bumper opening-and-closing portion 20, and a second operating member 43 for operating the mechanism (the first unlock mechanisms) which unlocks the lock mechanism (latches 5 and strikers 22) retaining the closed state of the lift gate 2. Both of the operating members 41, 43 are supported pivotally on a coaxial pivotal axis $C_1$ and the second operating member 43 is retained behind the first operating member 41. Herein, the operating members 41, 43 are normally biased in an arrow B1 direction about the axis $C_1$ by a spring or the like (not shown).

The first operating member 41 has a configuration that it extends in the vertical direction and in the width direction of the vehicle, which is pivotally supported on the axis $C_1$ extending in the width direction at its upper end portion and forms a handle 41a at its lower end portion which is operative to be touched by a operator. The operator puts a hand from below the handle 41a into the inside of the first operating member 41, and pulls the handle 41a back rearward for its operation. According to this operation, the first operating member 41 rotates about the axis $C_1$ in an arrow A1 direction.

The first operating member 41 also includes a tongue 41b extending forward from its side upper end (specifically, its left-side upper end). The tongue 41b is moved downward according to the operation of the first operating member 41, which pushes down one end of a swingable member 45 adaptive to be pivotally supported on an axis $C_2$ in the lift gate 2. Herein, the swingable member 45 rotates about the axis $C_2$ in an arrow A2 direction. The other end of the swingable member 45 extends downward and is coupled to a rod 47 via a retaining member 46 for unlocking the lock mechanism (latch 24 and striker 8) for the bumper opening-and-closing portion 20. The rod 47 is pulled up in an arrow A3 direction according to the rotation of the swingable member 45 in the arrow A2 direction. The swingable member 45 is normally biased by a spring or the like (not shown) in an arrow B2 direction about the axis $C_2$ and thus the rod 47 is pushed down in an arrow B3 direction.

The second operating member 43 extends in the vehicle width direction behind the first operating member 41 and has a configuration that its both ends bend to put the upper end of the first operating member 41 between the both ends. The second operating member 43 is pivotally supported on the same axis $C_1$ as the first operating member 41 at the portion putting the upper end of the first operating member 41 therebetween, and forms a handle 43a, which is operative to be touched by a operator, at its portion extending in the vehicle width direction behind the first operating member 41. The operator puts a hand between the handle 43a and the first operating member 41, and pulls the handle 43a back rearward for its operation. According to this operation, the second operating member 43 rotates about the axis $C_1$ in the arrow A1 direction.

Further, a tongue 43b extending forward is provided at one of the end portion of the second operating member 43 putting the upper end of the first operating member 41 therebetween such that it does not contact the tongue 41b and the swingable member 45 which are formed at the side end of the first operating member 41. The tongue 43b moves down according to the operation of the second operating member 43. A rod 49, which extends downward and is operative to unlock the lock mechanism (latch 5 and striker 22) for the lift gate 2, is coupled to an end of the tongue 43b via a retaining member 48. The rod 49 is pushed down in an arrow A4 direction by the tongue 43b moving down, thereby unlocking the latch 5 and striker 22. Since the second operating member 43 is biased in the arrow B1 direction about the axis C1, the rod 49 is normally pulled up.

Figure 10:
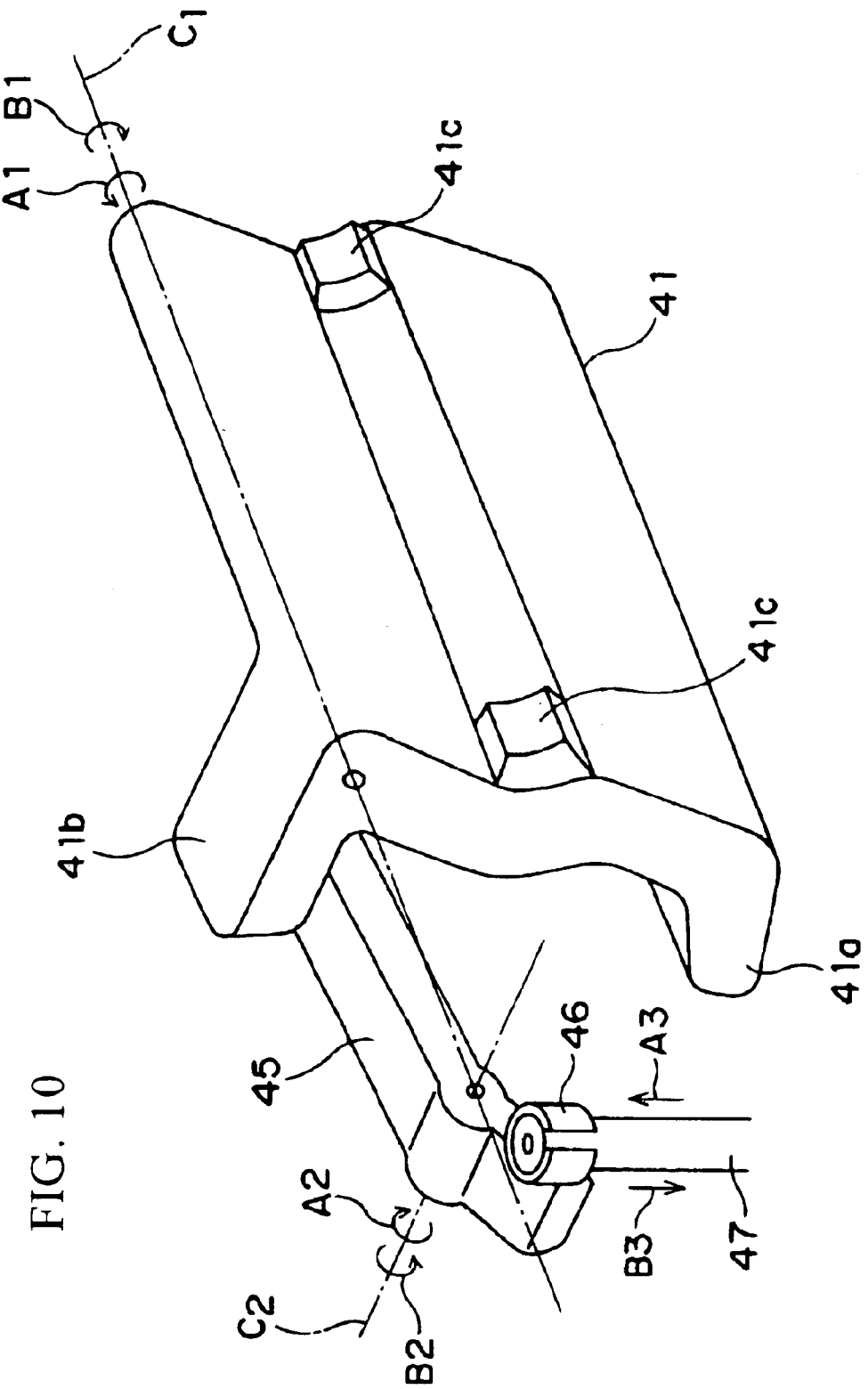
FIG. 10 is a perspective view of a first operating member of the first operating lever.

FIG. 10 illustrates a structure that the second operating member 43 is removed from the one shown in FIG. 9. As shown in FIG. 10, the first operating member 41 is provided with a pair of projections 41c extending rearward and upward at the back side thereof. The handle 43a of the second operating member 43 rests on upper end surfaces of the projections 41c when the second operating member 43 is not operated (see FIG. 9). A height of the projections is designed so that the operator can put the hand into the space between the first operating member 41 and the handle 43a of the second operating member 43 to operate the second operating member 43 while the second operating member 43 rests on the projections 41c.

Subsequently, an unlock operation of the first and second operating members 41, 43 of the first operating lever 40 will be described referring to FIG. 11. FIG. 11(a) illustrates a state where the second operating member 43 is operated, i.e., the handle 43a of the second operating member 43 is pulled up. As the handle 43a of the second operating member 43 is pulled up, rotating from its original position shown by a dash-dotted line about the axis $C_1$ to a position (unlock position) shown by a solid line, the rod 49 coupled to the tongue 43b (see FIG. 9) of the second operating member 43 is pushed down to a specified position. As a result, the lock mechanism for the lift gate 2 is unlocked and the lift gate 2 is in its opened state accordingly.

Meanwhile, FIG. 11(b) illustrates a state where the first operating member 41 is operated to open the lift gate 2 and the bumper opening-and-closing portion 20 at the same time, i.e., the handle 41a of the first operating member 41 is pulled up. As the handle 41a is pulled up, rotating from its original position shown by a dash-dotted line about the axis $C_1$ to a position (unlock position) shown by a solid line, the rod 47 coupled to the swingable member 45 (see FIG. 9) is pushed down to a specified position. As a result, the lock mechanism for the bumper opening-and-closing portion 20 is unlocked and the bumper opening-and-closing portion 20 is in its opened state accordingly.

Further, when the handle 41a of the first operating member 41 is moved to the unlock position shown by the solid line, the handle 43a of the second operating member 43 is also moved to its unlock position, resting on the projections at the back side of the first operating member 41. Accordingly, the rod 49 coupled to the tongue 43b (see FIG. 9) of the second operating member 43 is pushed down to unlock the lock mechanism for the lift gate 2, and thus the lift gate 2 is in its opened state.

Herein, the first operating member 40 can open both of the lift gate 2 and the bumper opening-and-closing portion 20 at the same time by operating the first operating member 41, resulting in an easy operation. Further, since the first operating member 41 for the both operation is located in front of the second operating member 43 in the first operating lever 40, it is easy to recognize the operating members, resulting in a convenient operation.

Figure 12:
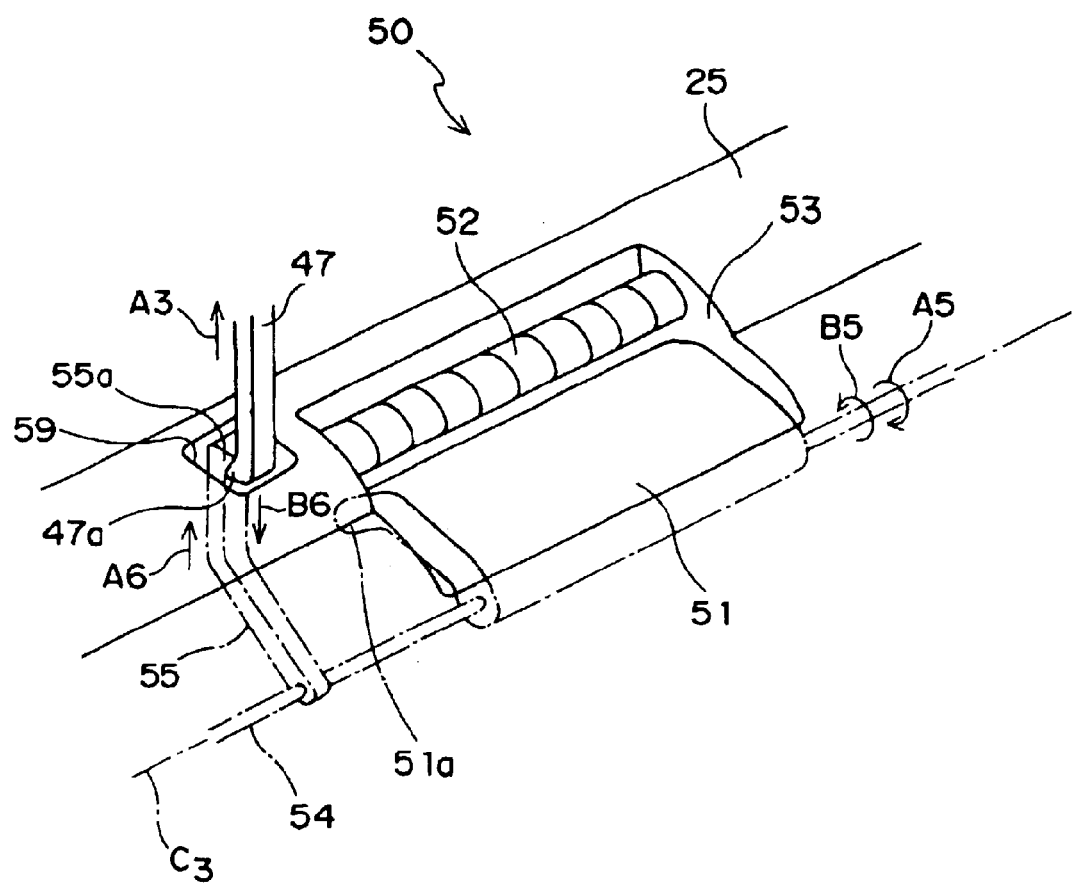
FIG. 12 is a perspective view of a second operating lever for unlocking the lock mechanism for the bumper opening-and-closing portion.

Next, the second operating lever 50 disposed at the upper end of the bumper opening-and-closing portion 20 will be described. FIG. 12 is a perspective view of the second operating lever 50. The second operating lever 50 is configured so as to unlock the lock mechanism (latch 24 and striker 8) for retaining the closed state of the bumper opening-and-closing portion 20 in a recess 53 formed at the upper end of the bumper facer 25, which includes an operating member 51 extending in the vehicle longitudinal and width directions and a grip 42 extending in the vehicle width direction for pulling up the bumper opening-and-closing portion. The operating member 51 is pivotally supported on an axis $C_3$ via an axis member 54 at its rear end, and includes a handle 51a to be touched by an operator's hand at its front end. The operator puts the hand into a space below the handle 51a from the front end side of the operating member 51 and then pulls up the handle 51a. Thus, the operation of the operating member 51 is performed. Herein, the operating member 51 rotates in an arrow A5 direction about the axis $C_3$, and then the latch 24 and the striker 8 at the vehicle body side are unlocked via the axis member 54 coupled to the latches 24 (see FIG. 5) fixed to the main body 21 at its both ends.

Further, a rod 55 for linking the first operating lever 40 disposed at the lift gate 2 with the second operating lever 50 is pivotally supported on the axis $C_3$ along with the operating member 51, which is located next to the operating member 51. One end of the rod 55 extends upward toward the aperture 59 formed near the recess 53 of the bumper facer 25 and includes a hook 55a at its end.

The rod 47, which is coupled to the swingable member 45 at the side of the first operating lever 40 and extends downward from above, includes a hook 47a at its end which is adaptive to engage the hook 55a of the rod 55, corresponding to the rod 55. The operating member 51 and the rod 55 are normally biased respectively in directions of arrows B5, B6 by a spring or the like (not shown). When the rod 47 is pulled up in the arrow A3 direction according to the operation of the first operating member 41 of the first operating lever 40 disposed at the side of the lift gate 2, the rod 55 engaged with the rod 47 is pulled up in an arrow A6 direction. As a result, an rotational force is applied to the operating member 51 of the second operating lever 50 so as to be rotated in the arrow A5 direction about the $C_3$ axis, and the latch 24 and the striker 8 at the vehicle body side are unlocked via the axis member 54.

Figure 13:
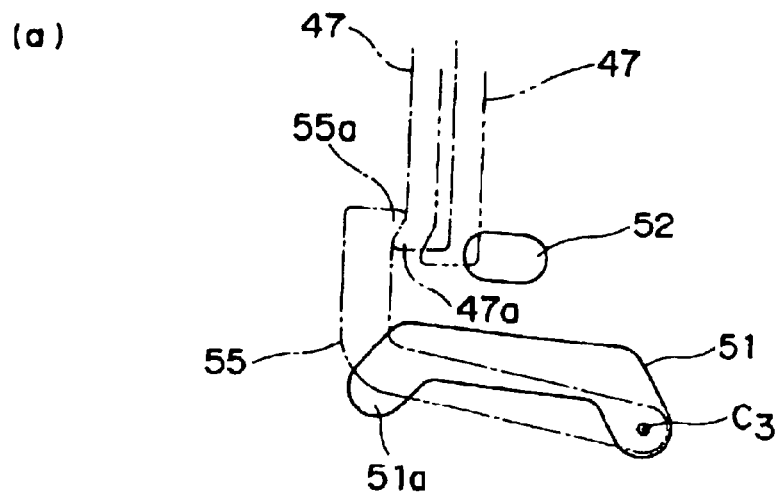
FIGS. 13(a), (b), and (c) are explanatory diagrams illustrating movements of the second operating lever when the first operating member of the first operating lever is operated.
Figure 13:
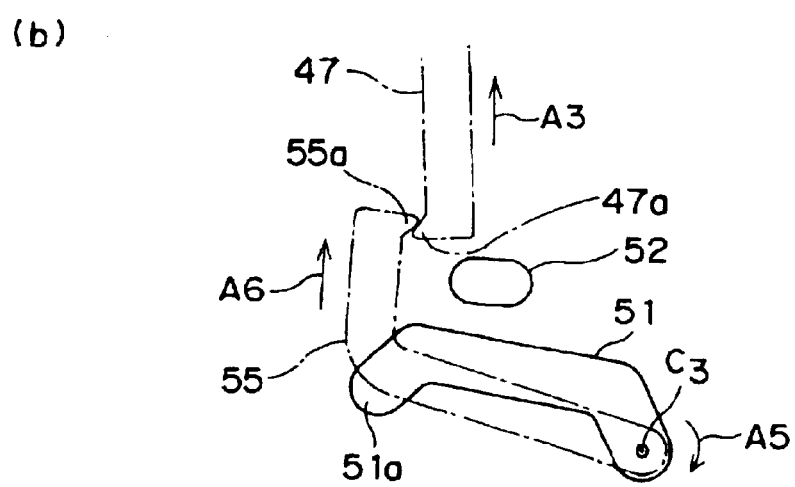
Figure 13:
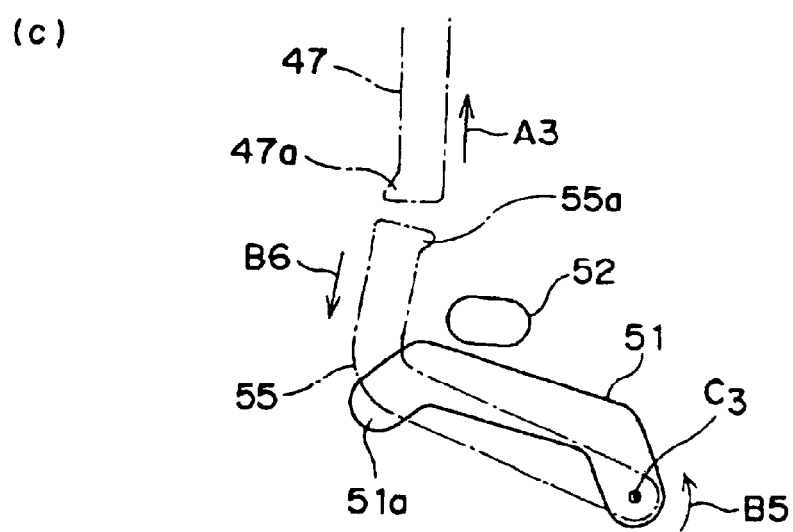

FIG. 13 is an explanatory diagram illustrating a movement of the second operating lever 50 when the first operating member 41 of the first operating lever 40 is operated. Firstly, in a state illustrated in FIG. 13(a), the rod 47 coupled to the swingable member 45 (see FIG. 9) is started moving from a position (shown by two-dotted broken line) prior to the operation of the first operating member 41 according to the operation of the first operating member 41, and then it is engaged with the rod 55 coupled to the operating member 51 of the second operating lever 50.

FIG. 13(b) illustrates a state where the first operating member 41 of the first operating lever 40 is further operated from the state illustrated in FIG. 13(a). According to the further operation of the first operating member 41, the rod 47 is pulled up in the arrow A3 direction, and the rod 55 engaged with the rod 47 is pulled up in the arrow A6 direction accordingly. At the same time, the operating 51 of the second operating lever 50 is rotated in the arrow A5 direction about the axis $C_3$.

FIG. 13(c) illustrates a state where the lock mechanism for the bumper opening-and-closing portion 20 has just been unlocked after further operation of the first operating member 41 of the first operating lever 40 from the state illustrated in FIG. 13(b). According to the further operation of the first operating member 41, the rod 47 is further pulled up in the arrow A3 direction, and the rod 55 engaged with that is pulled up to a position in which the latch 24 and the striker 8 are unlocked via the axis member 54 (see FIG. 12). Herein, the operating member 51 of the second operating lever 50 is also moved to its unlock position. The rod 55 is released from the rod 47 just after arriving at the unlock position, and then it is moved along with the operating member 51 by a biasing force of a spring or the like and returns to the state illustrated in FIG. 13(a).

According to this linkage mechanism, the operation of the first operating lever 40 disposed at the lift gate 2 can unlock the lock mechanism for the bumper opening-and-closing portion 20 and open the lift gate 2 and the bumper opening-and-closing portion 20 at the same time accordingly.

Figure 11:
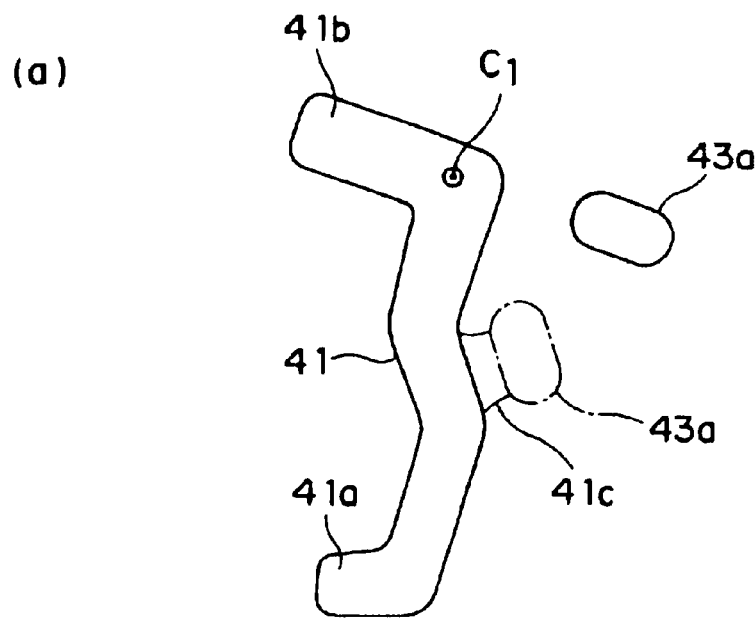
FIG. 11(a) is an explanatory diagram illustrating a second operating member of the first operating lever which is operated for opening the lift gate.
FIG. 11(b) is an explanatory diagram illustrating the first operating member of the first operating lever which is operated for opening the lift gate and the bumper opening-and-closing portion at the same time.
Figure 11:
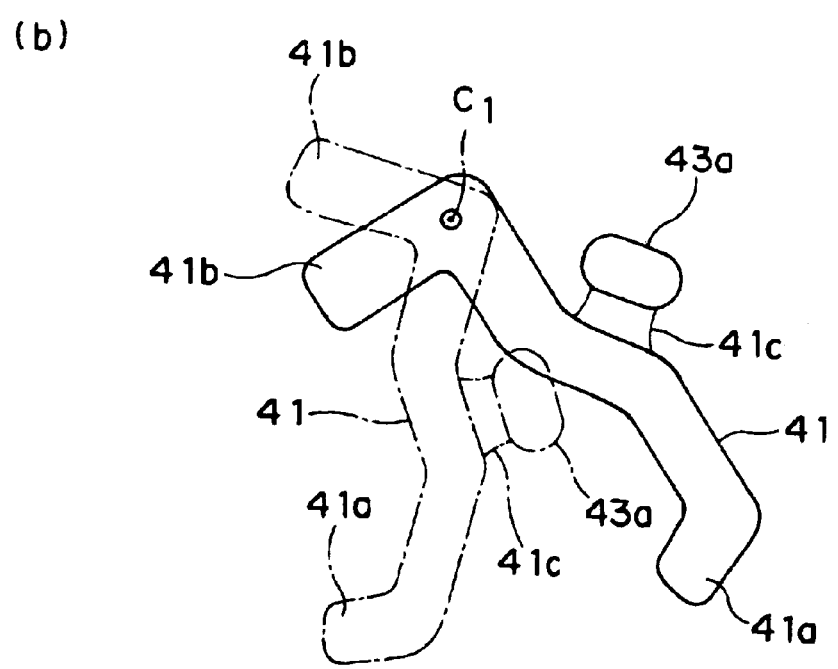
Figure 14:
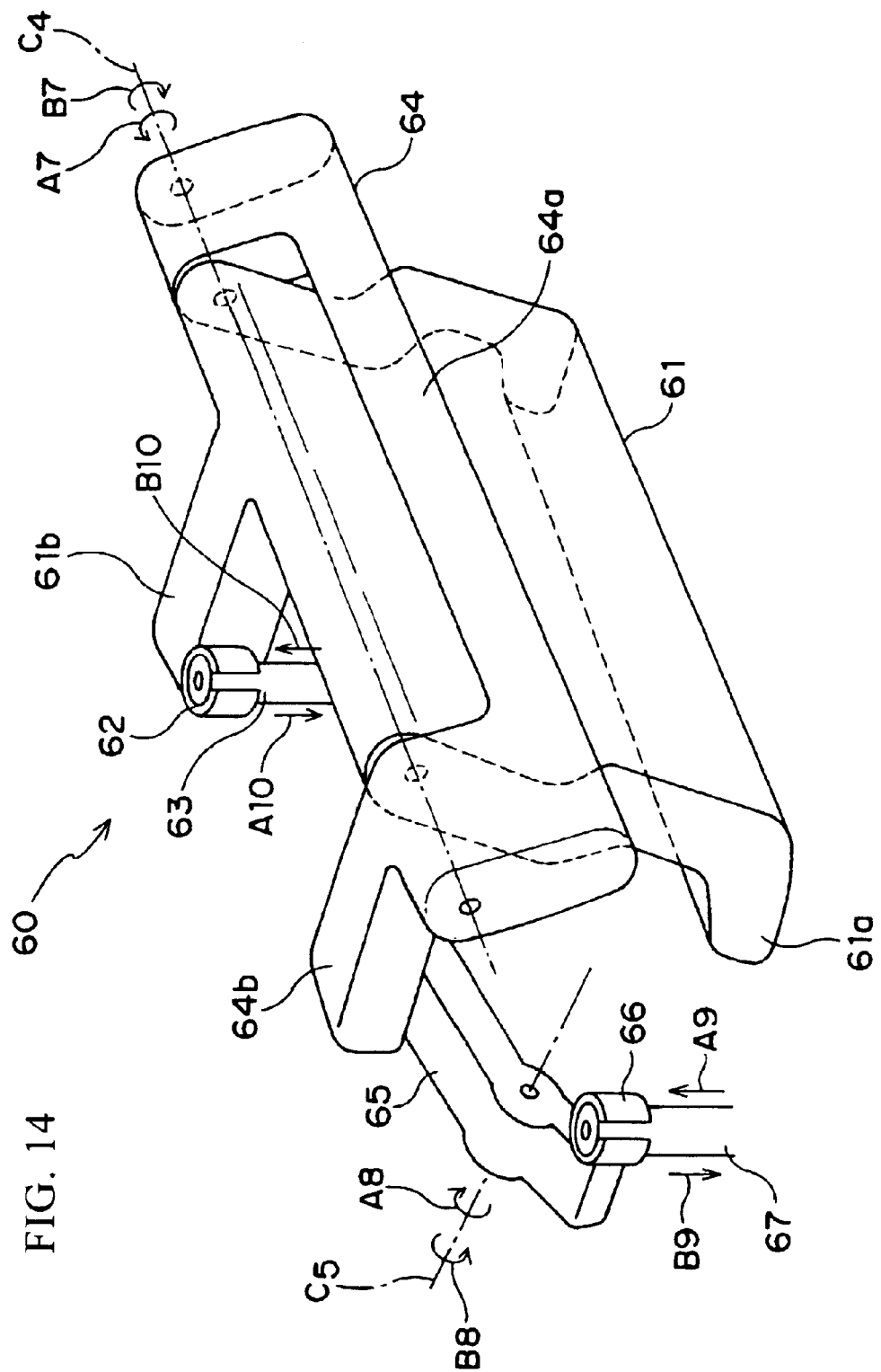
FIG. 14 is a perspective view illustrating a modified example of the first operating lever.

FIG. 14 is a perspective view of a first operating lever 60 which is a modified example of the first operating lever 40 which was described referring to FIGS. 9 to 11. In FIG. 14, the upper left corresponds to the front of the vehicle and the lower right corresponds to the rear of the vehicle.

The first operating lever 60 enables opening of only the lift gate 2, opening of both of the lift gate 2 and the bumper opening-and-closing portion 20 at the same time, and further opening of only the bumper opening-and-closing portion 20. The first operating lever 60 comprises basically a first operating member 61 for operating only the mechanism (the first unlock mechanism) to unlock the lock mechanism for retaining the lift gate 2 in its closed position, or also operating the mechanism (the second unlock mechanism) to unlock the lock mechanism for retaining the bumper opening-and-closing portion 20 at its closed position at the same time, and a second operating member 64 for operating only the mechanism to unlock the lock mechanism (latches 8 and strikers 24) for retaining bumper opening-and-closing portion 20 at its closed position. Both of the operating members 61, 64 are supported pivotally on the coaxial pivotal axis $C_4$ and the second operating member 64 is retained behind the first operating member 61. Herein, the operating members 61, 64 are normally biased in an arrow B7 direction about the axis $C_4$ by a spring or the like (not shown).

The first operating member 61 has a configuration that it extends in the vertical direction and in the width direction of the vehicle, which is pivotally supported on the axis $C_4$ extending in the width direction at its upper end portion and forms a handle 61a at its lower end portion which is operative to be touched by the operator. The operator puts a hand from below the handle 61a into the inside of the first operating member 61, and pulls the handle 61a back rearward for its operation. According to this operation, the first operating member 61 rotates about the axis $C_4$ in an arrow A7 direction.

The first operating member 61 also includes a tongue 61b extending forward from its upper end. The tongue 61b is moved downward according to the operation of the first operating member 61, whose end is coupled to a rod 63, which extends downward and is operative to unlock the lock mechanism (latch 5 and striker 22) for the lift gate 2, via retaining member 62. The rod 63 is pushed down in an arrow A10 direction according to the downward movement of the 61b to unlock the lock mechanism for the lift gate 2. The first operating member 61 is normally biased in the arrow B7 direction about the axis $C_4$ and thus the rod 63 is pulled up in an arrow B10 direction.

The second operating member 64 extends in the vehicle width direction behind the first operating member 61 and has a configuration that its both ends bend to put the upper end of the first operating member 61 between the both ends. The second operating member 64 is pivotally supported on the same axis $C_4$ as the first operating member 61 at the portion putting the upper end of the first operating member 61 therebetween, and forms a handle 64a, which is operative to be touched by the operator, at its portion extending in the vehicle width direction behind the first operating member 41. The operator puts a hand between the handle 64a and the first operating member 61, and pulls the handle 64a back rearward for its operation. According to this operation, the second operating member 64 rotates about the axis $C_4$ in the arrow A7 direction.

Further, a tongue 64b extending forward is provided at one of the end portion of the second operating member 64 putting the upper end of the first operating member 61 therebetween such that it does not contact the tongue 61b formed at the upper end of the first operating member 61. The tongue 64b moves down according to the operation of the second operating member 64. The tongue 64b moving down in this way pushes down one end of a swingable member 65 which is pivotally supported on an axis $C_5$ in the lift gate 2. Herein, the swingable member 65 rotates in an arrow A8 direction about the axis $C_5$. A rod 67, which extends downward and is operative to unlock the lock mechanism (latch 24 and striker 8) for the bumper opening-and-closing portion 20, is coupled to the other end of the swingable member 65 via a retaining member 66. The rod 67 is pulled up in an arrow A9 direction according to the rotation of the swingable member 65 in the arrow A8 direction. The swingable member 65 is biased in the arrow B8 direction about the axis $C_5$ by a spring or the like (not shown), and thus the rod 67 is normally pulled down in the arrow B9 direction.

Figure 15:
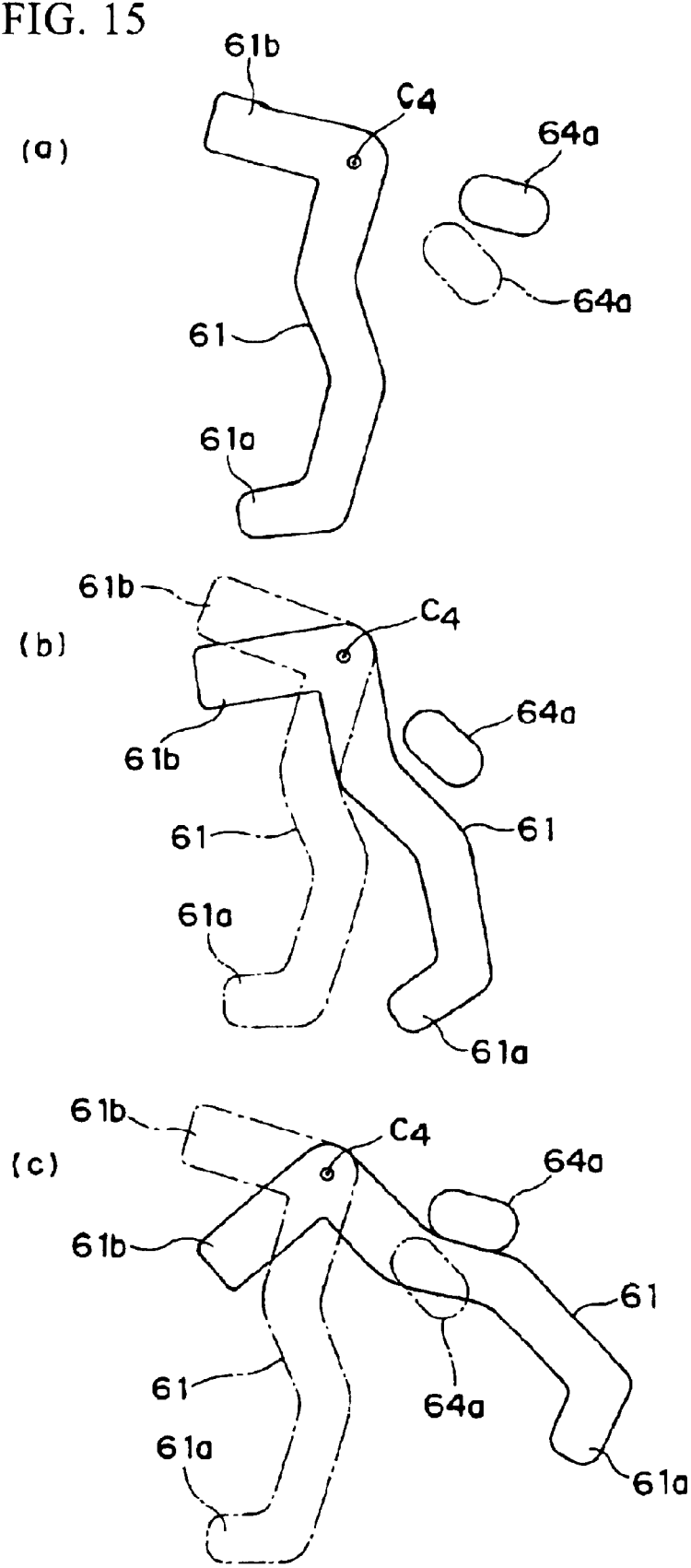
FIG. 15(a) is an explanatory diagram illustrating a second operating member of a first operating lever of the modified example which is operated for opening only the bumper opening-and-closing portion.
FIG. 15(b) is an explanatory diagram illustrating a second operating member of the first operating lever of the modified example which is operated for opening only the lift gate.
FIG. 15(c) is an explanatory diagram illustrating the first operating member of the first operating lever of the modified example which is operated for opening the lift gate and the bumper opening-and-closing portion at the same time.

Subsequently, an unlock operation of the first and second operating members 61, 64 of the first operating lever 60 will be described referring to FIG. 15. Firstly, FIG. 15(a) illustrates a state where the second operating member 64 is operated, i.e., the handle 64a of the second operating member 64 is pulled up. As the handle 64a of the second operating member 64 is pulled up, rotating from its original position shown by a dash-dotted line about the axis $C_4$ to a unlock position shown by a solid line, the rod 67 coupled to the swingable member 65 (see FIG. 14) is pulled up to a specified position. As a result, the lock mechanism (striker 8 and latch 24) for the bumper opening-and-closing portion 20, is unlocked and the bumper opening-and-closing portion 20 is in its opened state accordingly.

Further, FIG. 15(b) illustrates a state where the first operating member 61 is operated part of the way, i.e., the handle 61a of the first operating member 61 is pulled to a first unlock position. As the handle 61a of the first operating member 61 is pulled, rotating from its original position shown by a dash-dotted line about the axis $C_4$ to the first unlock position shown by a solid line, the rod 63 (see FIG. 14) coupled to the tongue 61b is pushed down to a specified position. As a result, the lock mechanism (latch 5 and striker 22) for the lift gate 2 is unlocked and the lift gate 2 is in its opened state accordingly.

Further, FIG. 15(c) illustrates a state where the first operating member 61 is operated to the end, i.e., the handle 61a of the first operating member 61 is pulled to a second unlock position. The handle 61a of the first operating member 61 is pulled, rotating further from the position shown by the solid line shown in FIG. 15(b) about the axis $C_4$, and finally moved to the second unlock position shown by a solid line in FIG. 15(c). On the way of the movement, the handle 64a of the second operating member 64 contacts the rear side of the first operating member 61, and then it is moved to its unlock position along with the first operating member 61. Accordingly, the rod 67 coupled to the swingable member 65 is pulled up to a specified position. As a result, the lock mechanism (striker 8 and latch 24) for the bumper opening-and-closing portion 20 is unlocked and the bumper opening-and-closing portion 20 is in its opened state accordingly.

As described above, the first operating lever 60 can open the lift gate 2 and the bumper opening-and-closing portion 20 independently, in addition to opening those at the same time. Accordingly, it can provide a variety of operation, resulting in a convenient operation.

Figure 16:
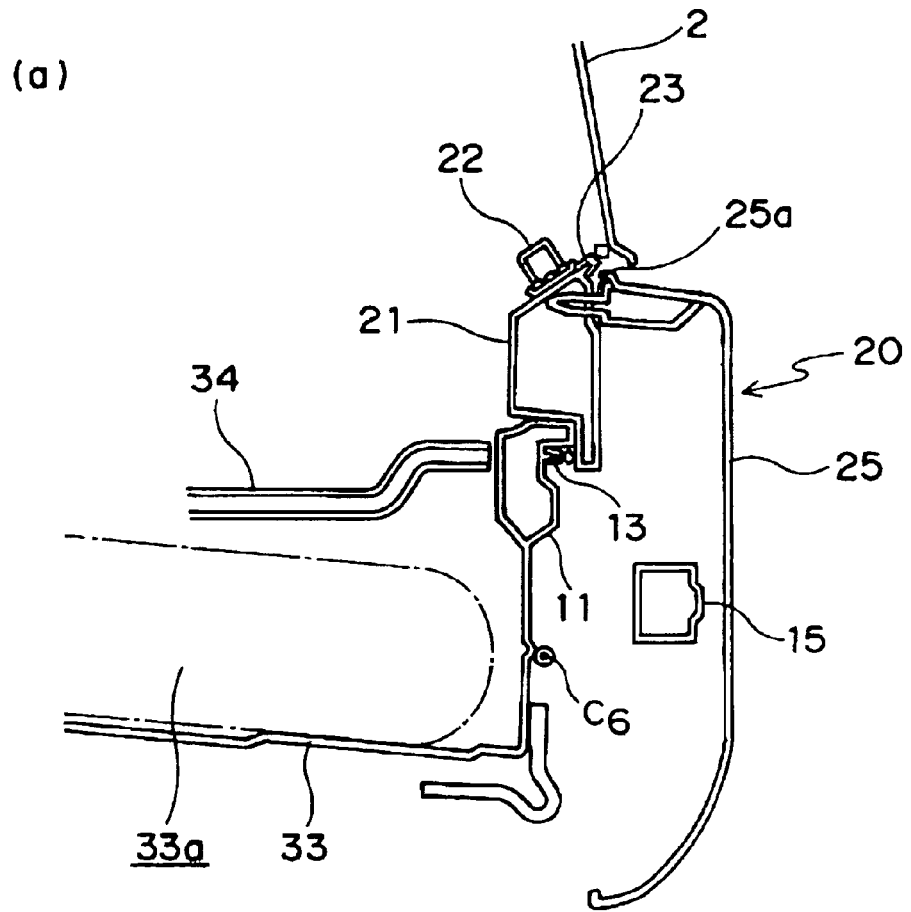
FIG. 16(a) is an explanatory vertically-sectional view of a modified example in which a pivotal axis of the swingable supporting member for supporting the bumper opening-and-closing portion is located at a substantially middle position of a bumper facer in the vertical direction of the vehicle, taken at the central portion of the bumper opening-and-closing portion closed in the width direction of the vehicle.
FIG. 16(b) is an explanatory vertically-sectional view of the bumper opening-and-closing portion opened of the modified example, taken at the central portion of the bumper opening-and-closing portion opened in the width direction of the vehicle.
Figure 16:
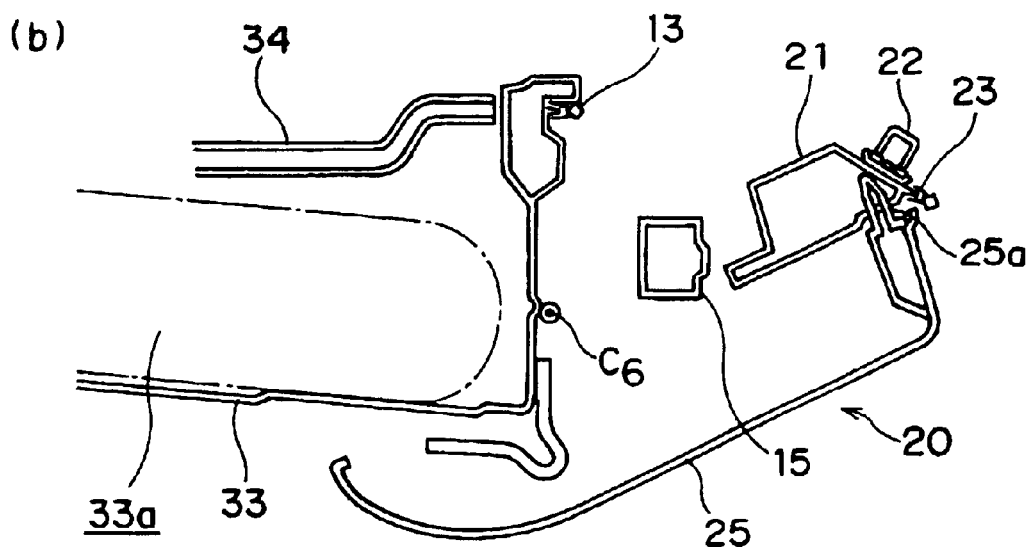

Finally, another modified example, in which the pivotal axis of the swingable supporting member for supporting the bumper opening-and-closing portion 20 is located at a different position from that of the above-described embodiment for the purpose of reducing the amount of backward movement of the bumper opening-and-closing portion 20 while opening, will be described referring to. FIG. 16. FIGS. 16(a) and 16(b) are explanatory vertically-sectional views of the bumper opening-and-closing portion 20 according to the modified example, taken at the central portion thereof in the width direction of the vehicle, which is in its closed position and its opened position, respectively.

In this example, a pivotal axis: $C_6$ of the swingable supporting member (not shown) is located more rearward, compared with the above-described embodiment, and at a substantially middle position of the bumper facer 25 in the vertical direction of the vehicle. The bumper opening-and-closing portion 20 rotates along with the swingable supporting member pivotally supported on the axis $C_6$ placed inside the vehicle body. Herein, like the above-described embodiment, the main body 21 of the bumper opening-and-closing portion 20 is always located in front of the bumper reinforcement 15 fixed to the specified position of the rear vehicle body, while the bumper facer 25 is always located behind the bumper reinforcement 15.

Accordingly, the structure according to this modified example can provide not only substantially the same effects as the above-described embodiment but a smaller movement area of the bumper opening-and-closing portion 20, thereby reducing the amount of backward movement of the bumper opening-and-closing portion 20 as much possible.

The present invention is not limited to the exemplified embodiments described herein, but any other modifications may be applied within the scope of the present invention.

What is claimed is:

1. A rear bumper structure for a vehicle, comprising:
   a bumper reinforcement fixed to a rear end of a vehicle body so as to define its fixed position with respect to the vehicle body and extend in a width direction of the vehicle; and
   a bumper opening-and-closing portion arranged to be movable in a substantially vertical direction of the vehicle so as to selectively open or close a lower part of a rear opening of a load compartment formed at a rear portion of the vehicle body, constituting at least part of a rear bumper of the vehicle,
   wherein said bumper opening-and-closing portion includes a main body of bumper opening-and-closing portion which is located in front of said bumper reinforcement in a longitudinal direction of the vehicle, a bumper facer which is attached to said main body to cover said bumper reinforcement from a rear side of the vehicle, and a moving mechanism which moves said main body in the substantially vertical direction of the vehicle and between the vehicle body and said bumper reinforcement such that said bumper reinforcement is always located between said main body and said bumper facer.

2. A rear bumper structure for a vehicle of claim 1, wherein said main body of bumper opening-and-closing portion is made of metal, and said bumper reinforcement is made of resin.

3. A rear bumper structure for a vehicle of claim 1, wherein said moving mechanism of the bumper opening-and-closing portion includes a supporting member connected to said main body of bumper opening-and-closing portion.

4. A rear bumper structure for a vehicle of claim 1, wherein there is provided at the vehicle body a seal which is located so as to contact said main body when said main body of bumper opening-and-closing portion is in its closed position.

5. A rear bumper structure for a vehicle of claim 1, wherein there is provided at said main body of bumper opening-and-closing portion an engagement member for engaging the vehicle body to retain said main body in its closed position when said main body of bumper opening-and-closing portion is in its closed position.

6. A rear bumper structure for a vehicle of claim 1, wherein there is provided at the vehicle body a lift gate for selectively opening or closing an upper part of the rear opening of the load compartment, and there is provided at said main body of bumper opening-and-closing portion a seal which is located so as to contact said lift gate when said bumper opening-and-closing portion is in its closed position.

7. A rear bumper structure for a vehicle of claim 1, wherein there is provided at the vehicle body a lift gate for selectively open or close an upper part of the rear opening of the load compartment, and there is provided at said main body of bumper opening-and-closing portion an engagement member for engaging said lift gate when said main body of bumper opening-and-closing portion is in its closed position.

8. A rear bumper structure for a vehicle of claim 3, wherein said supporting member is pivotally connected about a specified axis at the vehicle body, and the specified axis is located at a substantially middle position of said bumper facer in the vertical direction of the vehicle.

9. A rear bumper structure for a vehicle including a rear opening of a load compartment formed at a rear portion of a vehicle body and a lift gate for selectively opening or closing an upper part of the rear opening of the load compartment, comprising:
   a bumper reinforcement fixed to a rear end of a vehicle body so as to define its fixed position with respect to the vehicle body and extend in a width direction of the vehicle; and
   a bumper opening-and-closing portion arranged to be movable in a substantially vertical direction of the vehicle so as to selectively open or close a lower part of the rear opening of the load compartment, constituting at least part of a rear bumper of the vehicle,
   wherein said bumper opening-and-closing portion includes a main body of bumper opening-and-closing portion which is located in front of said bumper reinforcement in a longitudinal direction of the vehicle, a bumper facer which is attached to said main body to cover said bumper reinforcement from a rear side of the vehicle, and a moving mechanism which moves said main body in the substantially vertical direction of the vehicle and between the vehicle body and said bumper reinforcement such that said bumper reinforcement is always located between said main body and said bumper facer,
   wherein said moving mechanism of the bumper opening-and-closing portion includes a supporting member connected to said main body of bumper opening-and-closing portion, and there is provided at said main body of bumper opening-and-closing portion an engagement member for respectively engaging the vehicle body and said lift gate when said main body of bumper opening-and-closing portion is in its closed position.

* * * * *